(12) United States Patent
Kelly et al.

(10) Patent No.: US 7,201,984 B2
(45) Date of Patent: Apr. 10, 2007

(54) INTEGRATED SELF-COOLING PLANT SUPPORT MODULE FOR A FUEL CELL SYSTEM

(75) Inventors: Sean M. Kelly, Brighton, NY (US); Trevor T. Grover, Rushville, NY (US)

(73) Assignee: Delphi Technologies, Inc., Troy, MI (US)

( * ) Notice: Subject to any disclaimer, the term of this patent is extended or adjusted under 35 U.S.C. 154(b) by 540 days.

(21) Appl. No.: 10/606,849

(22) Filed: Jun. 26, 2003

(65) Prior Publication Data

US 2004/0265661 A1 Dec. 30, 2004

(51) Int. Cl.
*H01M 8/04* (2006.01)
*H01M 8/12* (2006.01)
*F25D 23/12* (2006.01)

(52) U.S. Cl. .......................... 429/26; 429/30; 429/20; 429/24; 429/34; 429/38; 62/411

(58) Field of Classification Search .................. 429/30, 429/20, 24, 26, 34, 38; 62/411
See application file for complete search history.

(56) References Cited

U.S. PATENT DOCUMENTS

| 5,269,265 | A | 12/1993 | Pretzsch et al. |
| 5,678,512 | A | 10/1997 | Colton |
| 6,562,496 | B2 * | 5/2003 | Faville et al. ................. 429/13 |
| 6,764,784 | B2 * | 7/2004 | Gillett et al. ................. 429/17 |

* cited by examiner

*Primary Examiner*—Patrick Joseph Ryan
*Assistant Examiner*—Angela J. Martin
(74) *Attorney, Agent, or Firm*—Paul L. Marshall

(57) ABSTRACT

An integrated system for air-cooling a main air blower drive motor and electronic control module in a fuel cell plant support module (PSM) disposed in an enclosure. Process air is drawn by a main blower fan into the enclosure through a filter and then is drawn from the enclosure into the blower via a first shroud surrounding the electronics process control module (ECM) and a second shroud surrounding the blower motor. The air cools these components and is thereby desirably warmed before being directed to the fuel cell assembly via an air distribution system. Thus, the PSM is constantly cooled and purged through the downstream processes, and the incoming air is constantly warmed by recovered heat from the PSM.

5 Claims, 4 Drawing Sheets

INTEGRATED SELF-COOLING PLANT SUPPORT MODULE FOR A FUEL CELL SYSTEM

STATEMENT REGARDING FEDERALLY SPONSORED RESEARCH OR DEVELOPMENT

This invention was made with United States Government support under Government Contract No. FC26-02NT41246. The Government has certain rights in the invention.

TECHNICAL FIELD

The present invention relates to means for air cooling of apparatus; more particularly, to such means for cooling components within enclosures for fuel cells; and most particularly, to an integrated self-cooling plant support module for a solid-oxide fuel cell system.

BACKGROUND OF THE INVENTION

Fuel cells which generate electric current by controllably combining elemental hydrogen and oxygen are well known. In one form of such a fuel cell, an anodic layer and a cathodic layer are separated by a permeable electrolyte formed of a ceramic solid oxide. Such a fuel cell is known in the art as a "solid-oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ ions catalytically by the cathode. The oxygen ions diffuse through the electrolyte and combine at the anode/electrolyte interface with four hydrogen ions to form two molecules of water. The anode and the cathode are connected externally through the load to complete the circuit whereby four electrons are transferred from the anode to the cathode. When hydrogen is derived by "reforming" hydrocarbons such as gasoline in the presence of limited oxygen, the "reformate" gas includes CO which is converted to $CO_2$ at the anode. Reformed gasoline is a commonly used fuel in automotive fuel cell applications.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack.

An enclosure for an SOFC system has two basic functions. The first function is to provide thermal insulation for some of the components which must function at an elevated temperature (700° C.–900° C.) to maintain them at that temperature for efficient operation, to protect lower temperature components outside the thermal enclosure, and to reduce the exterior temperature over the overall unit to a human-safe level. The second function is to provide structural support for mounting of individual components, mounting the system to another structure such as a vehicle, protection of the internal components from the exterior environment, and protection of the surrounding environment from the high temperatures of the fuel cell assembly.

In a solid-oxide fuel cell system, the "hot" components, e.g., the fuel cell stacks, the fuel reformer, tail gas combuster, heat exchangers, and fuel/air manifold, are contained in a "hot zone" within the thermal enclosure. The thermal enclosure is intended specifically for minimizing heat transfer to its exterior and has no significant structural or protective function for its contents. A separate and larger structural enclosure surrounds the thermal enclosure, defining a "cool zone" outside the thermal enclosure for incorporation of "cool" components, e.g., the air supply system and the electronic control system. The structural enclosure components are known in the art as a "plant support module" (PSM).

It is important that elements of the PSM be actively cooled during operation of the SOFC system. In the prior art, the elements are discrete, and such cooling is accomplished typically by employing various independent auxiliary fans or blowers, which are inefficient and which require additional power, package space, and independent ducting. Further, the heat removed from the PSM components is wasted by being discharged to the atmosphere via exhaust ports in the structural enclosure.

What is needed is a compact, integrated self-cooling PSM system for an SOFC, the system to include, at least, filtering incoming air, cooling an electronic control module and a main blower motor, and providing the resulting heated air forward as process air to the fuel cell assembly.

It is a principal object of the present invention to reduce the size and complexity of a fuel cell PSM cooling system.

It is a further object of the invention to pre-heat fuel cell process air by passing it over PSM components in need of active cooling.

SUMMARY OF THE INVENTION

Briefly described, an integrated system for air-cooling a main blower, drive motor, filter housing, and electronics housing is disposed at an entrance port in a wall of a PSM enclosure. Process air enters the PSM enclosure through a filter and then is drawn into the blower via a first jacket surrounding the electronics process control module (ECM) and a second jacket surrounding the blower motor. The air cools these components and is thereby desirably warmed before entering the blower fan and being directed to the fuel cell reformer and/or fuel cell stacks via a manifold or plenum having a plurality of independently-controllable air valves for metering air as needed to a plurality of process locations and functions. Thus, the PSM is constantly self-cooled and the enclosure purged through the downstream processes, and the incoming air is constantly warmed by recovered heat from the PSM.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
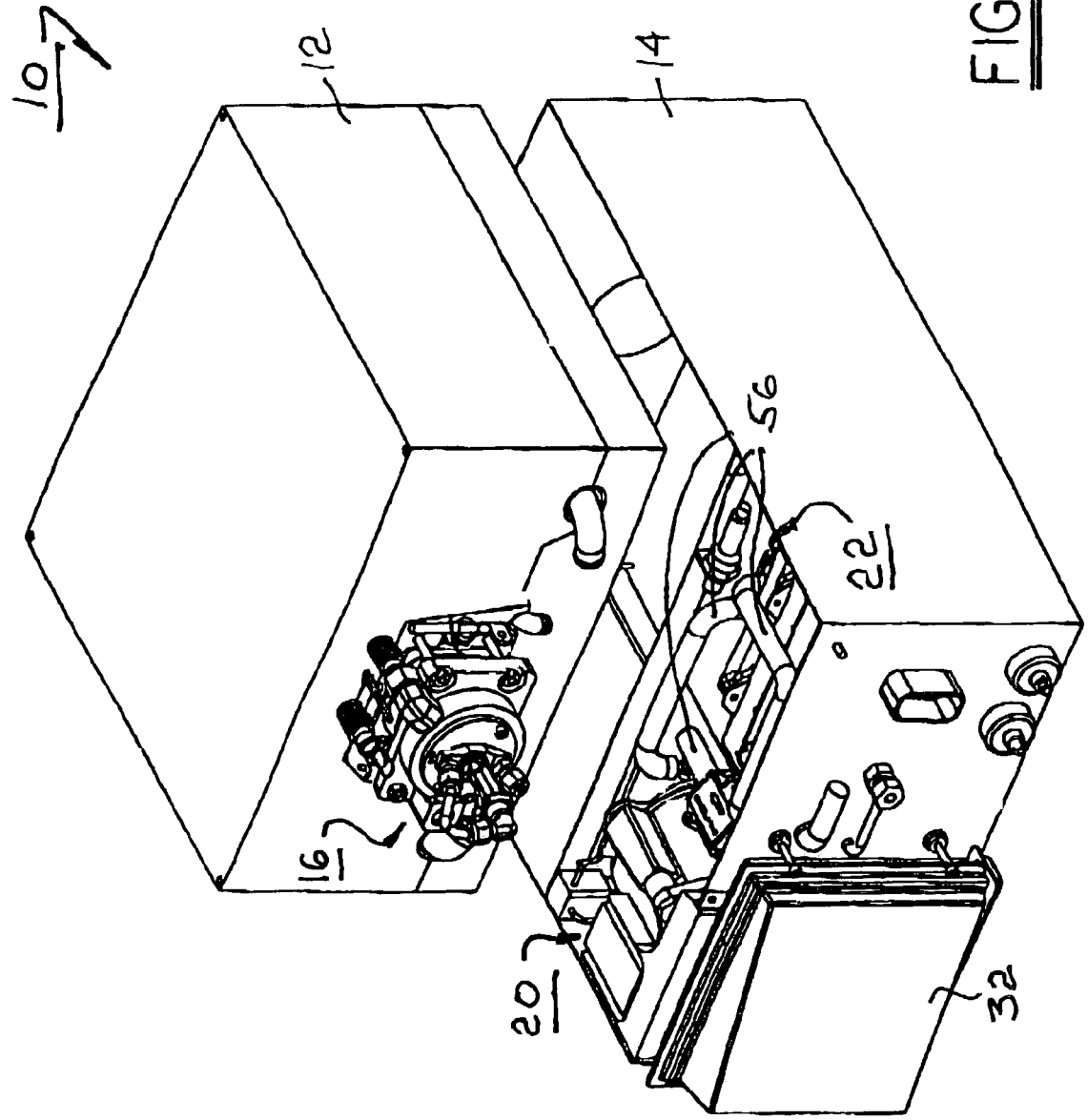
FIG. 1 is an isometric view, partially exploded, of a fuel cell system in accordance with the invention, showing a hot-zone fuel cell assembly in a thermal enclosure and a cool-zone PSM within a system structural enclosure.
Figure 2:
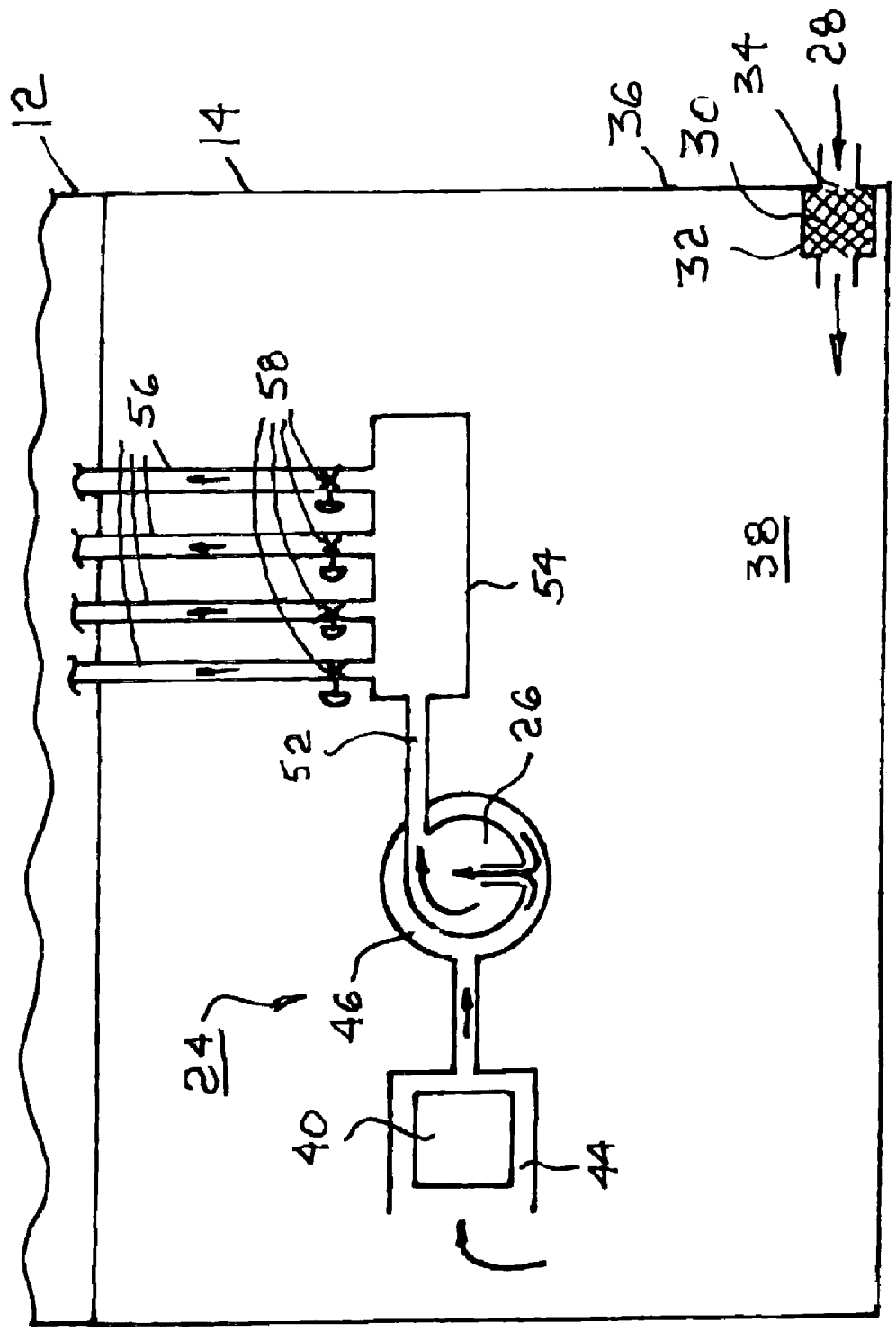
FIG. 2 is an isometric view of the cool-zone PSM shown in FIG. 1.
Figure 3:
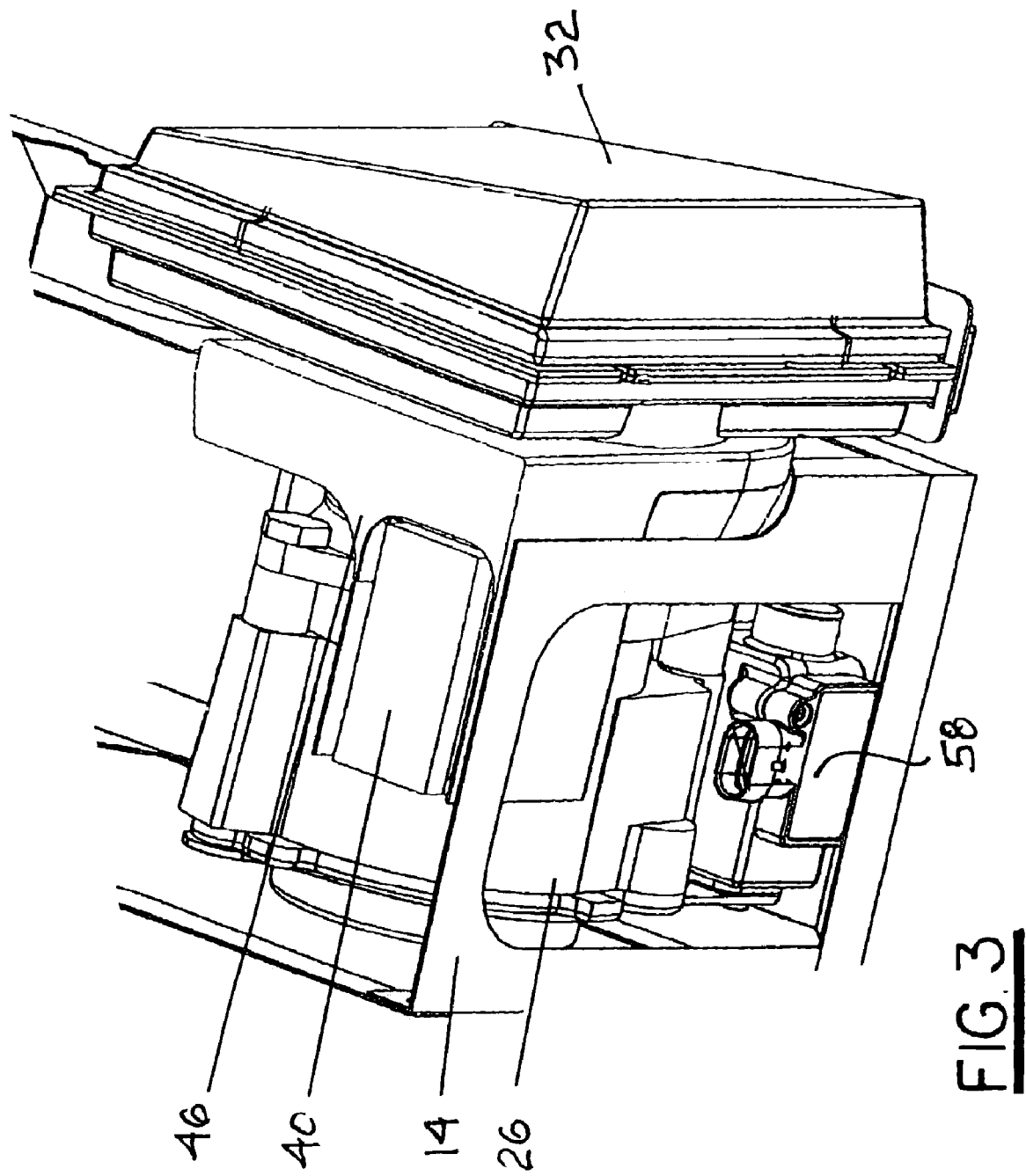
FIG. 3 is a first isometric detailed view of the self-cooling PSM shown in FIG. 1 from outside the enclosure.
Figure 4:
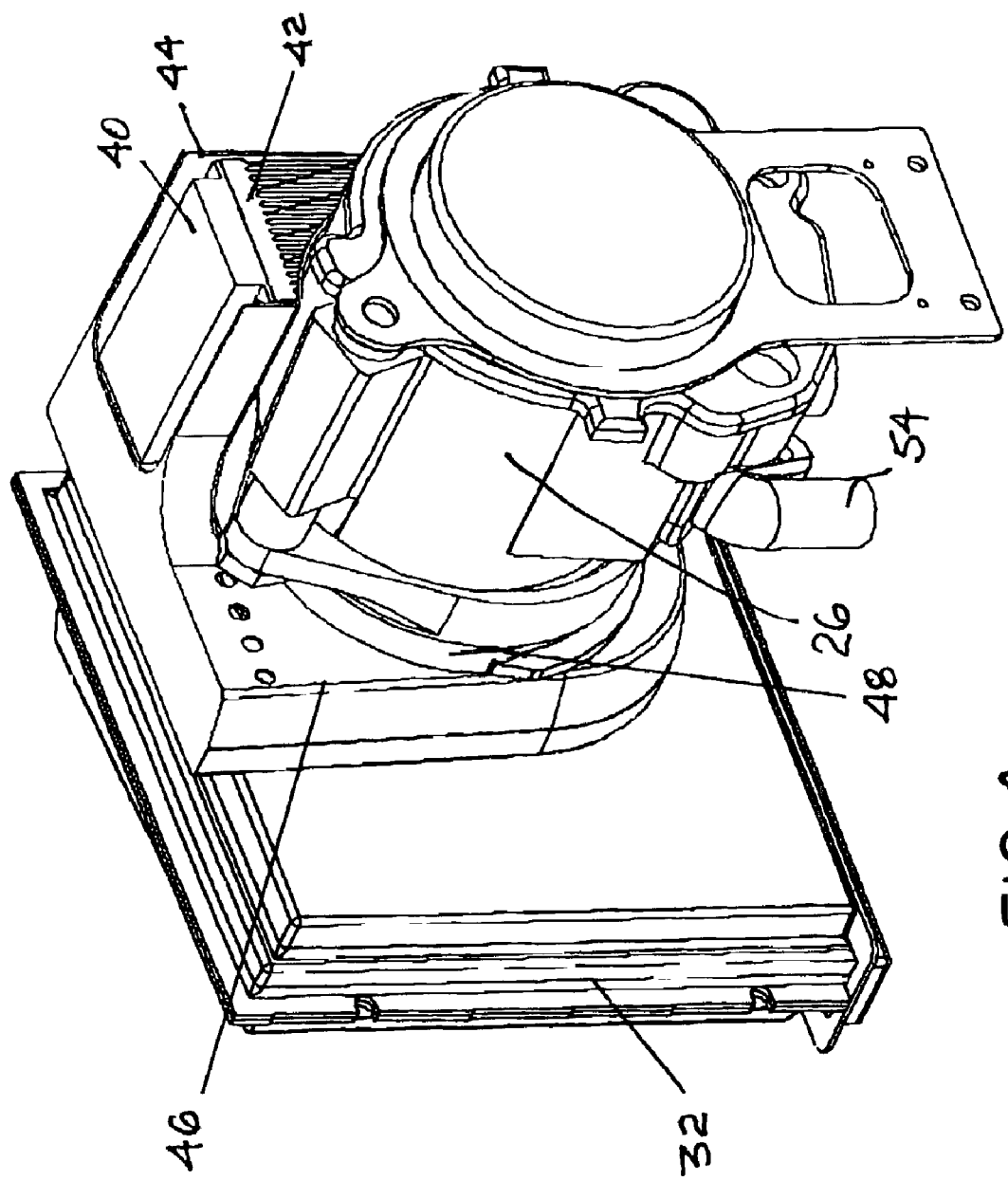
FIG. 4 is a second isometric detailed view of the self-cooling PSM shown in FIG. 1 from inside the enclosure.

Referring to FIG. 1, a solid-oxide fuel cell (SOFC) system 10 comprises two nested enclosures: a thermal enclosure 12 and a structural enclosure 14. Fuel cell assembly 16 is disposed in thermal enclosure 12 which in turn is disposed in structural enclosure 14. Thermal enclosure 12 defines a "hot zone" therewithin. Outside of thermal enclosure 12 is a "cool zone" within structural enclosure 14. Structural enclosure 14 preferably is fabricated from relatively thick metal to provide structural strength and a simple shape, such as a box with a removable lid, for ease of fabrication. A self-cooling plant support module 20 in accordance with the invention is connected via air distribution subassembly 22 to elements of fuel cell assembly 16 projecting from enclosure 14.

Referring to FIGS. 1 through 4, in an integrated system 24 for self-cooling of plant support module elements, a conventional high speed air blower 26 draws inlet air 28 at external ambient temperature through an air filter 30 in a filter housing 32 mounted at a port 34 in a wall 36 of enclosure 14. Air 28 is drawn into the interior 38 of enclosure 14 and mixes with air already therein. Inlet air 28 is then drawn from interior 38 past electronic control module 40 (preferably fitted with finned heat sink 42) disposed in a first cooling shroud 44, thence through a second cooling shroud 46 surrounding blower motor 48, and thence through blower 26. Warmed output air 52 from blower 26 is fed into a plenum 54 for supplying a plurality of known independent fuel cell functions via metered runners 56. The air control valves 58 of runners 56 are controllably operated by electronic control module 40.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An integrated self-cooling plant support module for incorporation into a fuel cell system including a fuel cell assembly, said module being disposed in an enclosure and being configured for drawing air from the exterior of said enclosure into the interior of said enclosure and to discharge air to the fuel cell assembly, said integrated module comprising:
    a) an inlet port in a wall of said enclosure;
    b) a motor mounted in said enclosure adjacent said inlet port;
    c) a blower mechanically connected to and driven by said motor and being in communication with said air distribution system;
    d) an electronic control module mounted adjacent said motor;
    e) a first shroud positioned within said enclosure and surrounding said electronic control module, said first shroud being open at one end to said interior of said enclosure and being connected at the other end to a second shroud; and
    f) said second shroud positioned within said enclosure and surrounding said motor, said second shroud being connected at one end to said first shroud in series and being open at the other end to said blower.

2. An integrated system in accordance with claim 1 further comprising an air filter disposed in communication with said wall inlet port.

3. An integrated system in accordance with claim 1 wherein said electronic control module is provided with a heat sink.

4. An integrated system in accordance with claim 1 wherein said air exterior to said enclosure is at ambient temperature and said air discharged to said fuel cell assembly is at a higher temperature.

5. A solid-oxide fuel cell system, comprising an integrated self-cooling plant support module, said module being disposed in an enclosure and being configured for drawing air from the exterior of said enclosure into the interior of said enclosure and to discharge air to said fuel cell assembly, said integrated module including
    an inlet port in a wall of said enclosure,
    a motor mounted in said enclosure adjacent said inlet port,
    a blower mechanically connected to and driven by said motor and being in communication with said air distribution system,
    an electronic control module mounted adjacent said motor,
    a first shroud positioned within said enclosure and surrounding said electronic control module, said first shroud being open at one end to said interior of said enclosure and being connected at the other end to a second shroud, and
    said second shroud positioned within said enclosure and surrounding said motor, said second shroud being connected at one end to said first shroud in series and being open at the other end to said blower.

* * * * *